United States Patent [19]

Miyoshi et al.

[11] Patent Number: 4,632,868

[45] Date of Patent: Dec. 30, 1986

[54] MAGNETIC RECORDING MEDIA

[75] Inventors: Takahito Miyoshi, Odawara; Masaaki Fujiyama, Minami-ashigara; Akihiro Matsufuji, Odawara, all of Japan

[73] Assignee: Fuji Photo Film Co., Ltd., Kanagawa, Japan

[21] Appl. No.: 744,568

[22] Filed: Jun. 14, 1985

[30] Foreign Application Priority Data

Jun. 21, 1984 [JP] Japan ................................. 59-126350

[51] Int. Cl.$^4$ ................................................ G11B 5/70
[52] U.S. Cl. .................................. 428/328; 252/62.54; 360/134; 360/135; 360/136; 427/128; 428/329; 428/403; 428/694; 428/695; 428/900
[58] Field of Search ............... 428/328, 329, 694, 695, 428/900, 403, 425.9; 252/62.54; 360/134–136; 427/128

[56] References Cited

U.S. PATENT DOCUMENTS

| 4,305,993 | 12/1981 | Zaitsu | 428/328 |
| 4,540,618 | 9/1985 | Suzuki | 428/694 |
| 4,567,109 | 1/1986 | Lehner | 428/694 |

FOREIGN PATENT DOCUMENTS 157722  8/1985  Japan ................. 428/329

Primary Examiner—Ellis P. Robinson
Attorney, Agent, or Firm—Burns, Doane, Swecker & Mathis

[57] ABSTRACT

A magnetic recording medium comprising a nonmagnetic supporting substrate and a magnetic layer provided thereon by a binder, said magnetic layer contains a ferromagnetic alloy powder having a specific surface area ($S_{BET}$) of no less than 45 m$^2$/g, and copper oleate in an amount of no less than 0.001 part by weight per 100 parts by weight of said ferromagnetic alloy powder.

5 Claims, No Drawings

MAGNETIC RECORDING MEDIA

FIELD OF THE INVENTION

The present invention relates to a magnetic recording medium and, in particular, to a magnetic recording medium having improved surface properties and electromagnetic conversion properties, in which the dispersibility of ferromagnetic alloy powders is excellent.

BACKGROUND

In the magnetic recording media (hereinafter referred to as the magnetic tapes) for audios, VTRs, computers and the like, there has recently an increasing demand for high-density recording in particular, and the magnetic tapes using ferromagnetic alloy powders are being produced. Furthermore, in order to improve the output in a high-frequency range, the ferromagnetic alloy powders should be more finely granulated, and the magnetic layers should be smoothened on the surface.

However, considerable difficulty is involved in uniform dispersion of the finely granulated ferromagnetic powders. Besides, finishing the magnetic layer's surface to a high smoothness causes an increase in the coefficient of friction, resulting in deterioration of the running characteristics. To add to this, such tendency becomes more prominent, as the powder becomes finer and finer.

In order to provide a solution to the aforesaid problems, heretofore, studies have been made of kneading methods (double ball mills, triple ball mills, pebble mills, high-speed mixers, etc.), addition of dipsersing agents and the like. However, there is not yet developed any method which sufficiently copes with higher performance demanded for the magnetic tapes.

SUMMARY OF THE DISCLOSURE

An object of the present invention is to provide a magnetic recording medium, in which the dispersibility and orientation properties of ferromagnetic alloy powders are favorable, and which has satisfactory electromagnetic conversion properties and surface properties as well as a low coefficient of friction, and excels in the running characteristics. Other objects of the present invention will become apparent in the entire disclosure.

As a result of intensive and extensive studies made of additives other than ferromagnetic alloy powders and binders, the present inventors have found that the aforesaid disadvantages are significantly eliminated by addition of copper oleate, and have accomplished the present invention.

The aforesaid object of the present invention is achieved by the provision of a magnetic recording medium comprising a nonmagnetic supporting substrate and a magnetic layer provided, i.e., directly or indirectly with an intermediate layer (subbing layer) thereon by a binder, characterized in that said magnetic layer contains (1) a ferromagnetic alloy powder having a specific surface area ($S_{BET}$) of no less than 45 $m^2/g$ (preferably no less than 50 $m^2/g$, and (2) copper oleate in an amount of no less than 0.001 part by weight (preferably 0.01 to 10 parts by weight and more preferably 0.03 to 5 parts by weight) per 100 parts by weight of said ferromagnetic alloy powder.

PREFERRED EMBODIMENTS OF THE INVENTION

The ferromagnetic alloy powders used for the magnetic layer of the present invention have a metal content of no less than 75% by weight, 80% by weight or more of which are at least one ferrogmagnetic metal (viz., Fe, Co, Ni, Fe—Co, Fe—Ni, Co—Ni or Co—Ni—Fe), and the remainder (no higher then 20% by weight) of which has a composition of Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P and the like and, in some cases, may contain small amounts of water, hydroxides or oxides.

Such ferromagnetic alloy powders may be prepared by the methods which follow and are well-known in the art.

(1) Decomposition of organic acid salts of ferromagnetic metals by heating, followed by reduction thereof with a reducing gas.

(2) Reduction, in a reducing gas, of acicular oxyhydroxides with or without other metals, or acicular iron oxides obtained by heating such oxyhydroxides.

(3) Thermal decomposition of metal carbonyl compounds.

(4) Evaporation of ferromagnetic metals in an inert gas of low pressure.

(5) Reduction of metals capable of forming ferromagnetic bodies in aqueous solutions of their salts with reducing substances (e.g., hydrogenated boron compounds, hypophosphites, hydrazine or the like), thereby obtaining ferromagnetic metal powders.

(6) Electrolytic deposition of ferromagnetic metal powders with the use of a silver cathode, followed by separation of silver.

The ferromagnetic alloy powders should have a specific surface area ($S_{BET}$) of no less than 45 $m^2/g$ (preferably no less than 50 $m^2/g$. Addition of copper oleate to the magnetic layers using such ferromagnetic alloy powders gives rise to improvements in the dispersibility of the ferromagnetic alloy powders and the surface gloss of the magnetic tapes, and leads to a lowering of the coefficient of friction. However, a specific surface area of no higher than 45 $m^2/g$ makes it impossible to obtain high reproduction output, and makes no contribution to improvements in the dispersibility, even when the oleate is added.

The binders used in the present invention include those known in the art such as, for instance, thermoplastic resins, thermosetting resins or reaction type resins, or mixtures thereof.

The thermoplastic resins used may have a mean molecular weight of 10,000 to 200,000 and a degree of polymerization of about 200 to 2000, and may include vinyl chloride-vinyl acetate copolymers, vinyl chloride-vinyl acetate-maleic acid copolymers, vinyl chloride-vinylidene chloride copolymers, vinyl chloride-acrylinitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-vinylidene chloride copolymers, methacrylate-sytrene copolymers, polyurethane resins, polyvinyl fluorides, vinylidene chloride-acrylonitrile copolymers, butadiene-acrylonitrile copolymers, polyamide resins, polyvinyl butyrals, cellulose derivatives (cellulose acetate butylate, cellulose diacetate, cellulose triacetate, cellulose propionate, nitrocellulose, cellulose acetate propionate, etc.), styrene-butadiene copolymers, polyester resins, thermoplastic resins based on various synthetic rubber (polybutadiene, polychloroprene, polyisoprene, styrene-butadiene copolymers, etc.), and mixtures thereof.

The thermosetting or reaction type resins used have a molecular weight of no higher than 200,000 in the state of coating liquid, and, upon being added after coating and drying, their molecular weight is increased to infinity due to combining, addition and the like reaction. Among others, preference is given to resins that do neither soften nor melt by the time they decompose thermally. Concretely speaking, there are for instance phenol-formalin-novalak resins, phenol-formalin-resol resins, phenol-furfural resins, xylene-formalin resins, urea resins, melamine resins, dry oil-modified alkyd resins, carbolic acid resin-modified alkyd resins, maleic acid resin-modified alkyd resins, unsaturated polyester resins, epoxy resins and setting agents (polyamine, acid anhydrides, polyamide resins and others), isocyanate-terminated polyester moisture-setting type resins, isocyanate-terminated polyether moisture-setting type resins, polyisocyanate prepolymers (compounds obtained by the reaction of diisocyanates with low-molecular triols and having at least three isocyanate groups in one moleucle, trimer and tetramers of diisocyanates), resins containing polyisocyanate prepolymers and active hydrogen (polyester polyols, polyether polyols, acrylic acid copolymers, maleic acid copolymers, 2-hydroxyethyl metacrylate copolymers, parahydroxystyrene copolymers and others), and mixtures thereof.

These binders may be used alone or in combination along with additives. In general, however, use is made of vinyl chloride-vinyl acetate copolymers, urethane elastomers, cellulose derivatives and the like.

These binders are used alone or in combination to form a magnetic coating paint. In this case, additives such as lubricants, antistatics, abrasives, etc. may be used.

Appropriately, the binder may be used in an amount of 15 to 40 parts by weight (preferably 16 to 35 parts by weight) per 100 parts by weight of the ferromagnetic alloy powder.

The antistatic agents used may include electrically conductive fine powders of carbon black, carbon black graft polymers, etc.,; natural surface active agents such as saponin; nonionic surface active agents based on alkylene oxides, glycerin, glycidols and the like; cationic surface active agents such as higher alkylamines, quaternray ammonium salts, pyridine or other heterocyclic compounds, phosphoniums or sulphoniums and the like; anionic surface active agents containing acid groups such as carboxylic, sulphonic, phosphoric, sulfate, phosphate and the like groups; and amphoteric surface active agents such as amino acids, aminosulphonic acids, sulfates or phosphates of amino alcohols, etc.

The aforesaid conductive fine powders may be added in an amount of 0.2 to 20 parts by weight per 100 parts by weight of the binders, and the aforesaid surface active agents may be added in an amount of 0.1 to 10 parts by weight per 100 parts by weight of the binders.

These surface active agents may be added alone or in combination. These agents are used as the antistatics, but may be applied for other purposes, say, for the purpose of improving the dispersibility as well as the magnetic and lubricating properties, and as coating aids in some cases.

The ferromagnetic alloy powders are kneaded with abrasives, solvents, etc. in addition to the foregoing binders, dispersing agents, lubricants, antistatics, etc. to form a magnetic coating paint.

In kneading, the ferromagnetic alloy powders and the aforesaid various components are continuously or successively introduced in a kneader. For instance there is the method wherein the ferromagnetic alloy powders are added into the solvent along with the dispersing agent, and kneading is continued for the predetermined period of time to form a magnetic coating paint.

Kneading and dispersion of the magnetic coating paint may be effected by means of various kneaders exemplified by two-roll mills, three-roll mills, ball mills, pebble mills, drum mills, sand grinders, Szegvari Atritor (trade name), high-speed impeller dispersion machines, high-speed stone mills, high-speed impact mills, dispersion kneaders, high-speed mixers, homogenizers, ultrasonic dispersion machines, etc.

The techniques for kneading and dispersion are described in T. C. PATTON "Paint Flow and Pigment Dispersion", (1964, John Wiley & Sons) as well as U.S. Pat. Nos. 2,581,414 and 2,855,156 specifications.

The methods used to coat the magnetic layer onto the nonmagnetic supporting substrate embrace air doctor coating, blade coating, rod coating, extrusion coating, air knife coating, squeeze coating, impregnation coating, reverse-roll coating, transfer-roll coating, gravure coating, kiss-roll coating, cast coating, spray coating, spin coating and the like, and other like methods. For the concrete and detailed explanation thereof, see "COATING ENGINEERING" pages 253 to 277, Mar. 20, 1971, Asakura Shoten.

Coating should be effected in such a manner that the thickness of the magnetic layer falls under the range of 0.5 to 10 microns (preferably 1.5 to 7.0 microns) on the dry basis.

After the magnetic layer coated onto the supporting substrate by such methods has been treated to orientate the ferromagnetic alloy powders therein, if necessary, the thus formed magnetic layer is dried. If necessary, the thus dried layer may be subjected to a surface-smoothening treatment. Examples In the following, the present invention will more concretely be explained with reference to the examples, wherein "parts" means "parts by weight".

EXAMPLES 1–4

The following formulations were coated onto polyethylene terephthalate bases having a thickness of 10 microns to form magnetic layers having a dry thickness of 3.5 microns.

| Formulations for Magnetic Layer-Coating Liquids to be Kneaded and Dispersed | |
|---|---|
| Ferromagnetic Alloy Powders (Fe—Ni alloy, Ni: about 5% by weight) (Specific Surface Area ($S_{BET}$): described in Table 1) | 100 parts |
| Vinyl Chloride-Vinyl Acetate Copolymer ("400 × 110A" manufactured by Nippon Zeon Co., Ltd) | 11 parts |
| Urethane Resin ("N-2301" manufactured by Nippon Polyurethane Co., Ltd.) | 11 parts |
| Carbon Black (Mean Particle Size: 40 millimicrons) | 2 parts |
| $Cr_2O_3$ powders | 1 part |
| Stearic Acid | 1 part |
| Oleic Acid | 1 part |
| Butyl Stearate | 1 part |
| Copper Oleate | described in Table 1 |

| Formulations for Magnetic Layer-Coating Liquids to be Kneaded and Dispersed | |
|---|---|
| -continued | |
| Methyl Ethyl Ketone | 500 parts |

Eight (8) parts of polyisocyanate "Colonate L" manufactured by Nippon Polyurethane Co., Ltd. and 100 parts of methyl ethyl ketone were added as the setting agents to the foregoing formulations for kneading and dispersion, thereby obtaining coating liquids.

Each coating liquid was applied onto the polyethylene terephthalate base, followed by drying and calendering. The obtained layer was slitted into a width of 12.2 mm (0.5 inches), and was thereafter estimated on its tape performance The results are set forth in Table 1 (examples).

Glossiness

Estimation was made according to JIS Z8741. The mirror surface glossiness of the surface of glass having a refractive index of 1.567 was taken as 100% at an incident angle of 45°.

Reproduction Output

The reproduction output at a recording wavelength of 1 micron was measured at a half speed on VTR made by TOSHIBA (V-500-D) with a ferrite head. A zero point five (½)-inch regular tape (manufactured by Fuji Photo Film Co., Ltd. and using gamma-iron oxide containing Co) was used as the reference tape.

COMPARISON EXAMPLES 1–4

The procedures of the examples were repeated, provided that no copper oleate was added, and the ferromagnetic alloy powders having a specific surface area ($S_{BET}$) of less than 45 m²/g were used. The tape performance of the resulting tape magnetic tapes were measured. The results are set forth in Table 1 (including comparison examples).

As appreciated from the examples, addition of copper oleate introduces improvements into gloss and gives rise to an increase in the reproduction output. Such effects are prominently produced in the event that the ferromagnetic alloy powders having poor dispersibility are particularly used as the magnetic body. According to the present invention, there is provided a magnetic recording medium having improved surface properties and electromagnetic conversion properties by taking advantage of the characteristic features described in the appended claims.

TABLE 1

| Samples | Specific Furnace Area of Ferromagnetic Alloy Powder ($S_{BET}$) (m²/g) | Amount of Copper Oleate (part) | Gloss (%) | Reproduction Output (dB) |
|---|---|---|---|---|
| Example 1 | 45 | 2 | 275 | 6 |
| Example 2 | " | 4 | 275 | 6 |
| Example 3 | 50 | 2 | 280 | 7 |
| Example 4 | " | 4 | 280 | 7 |
| Comparative Example 1 | 40 | 0 | 247 | 4 |
| Comparative Example 2 | " | 2 | 247 | 4 |
| Comparative Example 3 | 45 | 0 | 250 | 4 |
| Comparative Example 4 | 50 | 0 | 250 | 4 |

*The samples of Examples 1 to 4 having high gloss and improved surface properties were passed on VTR 100 times, but no abnormality was found.

What is claimed is:

1. A magnetic recording medium comprising a nonmagnetic support substrate and a magnetic layer provided thereon by a binder, characteristic in that said magnetic layer contains (1) a ferromagnetic alloy powder having a specific surface area ($S_{BET}$) of no less than 45 m²/g and (2) copper oleate in an amount of no less than 0.001 part by weight per 100 parts by weight of said ferromagnetic alloy powder.

2. The magnetic recording medium as defined in claim 1, wherein 0.01 to 10 parts by weight of copper oleate per 100 parts by weight of said ferromagnetic alloy powder is present.

3. The magnetic recording medium as defined in claim 2, wherein copper oleate is 0.03 to 5 parts by weight per 100 parts by weight of said ferromagnetic alloy powder.

4. The magnetic recording medium as defined in claim 1, wherein the ferromagnetic alloy powder has a specific surface area ($S_{BET}$) of no less than 50 m²/g.

5. The magnetic recording medium as defined in claim 1, wherein the binder comprises one or more selected from the group consisting of vinyl chloride-vinyl acetate copolymers, urethane elastomers and cellulose derivatives.

* * * * *